United States Patent Office 2,892,865
Patented June 30, 1959

2,892,865
PROCESS FOR THE PREPARATION OF TERTIARY ESTERS OF BENZOYLCARBINOL

Pier Nicola Giraldi and Willy Logemann, Milan, Italy, assignors to Carlo Erba S.p.A., Milan, Italy, a firm No Drawing. Application November 4, 1957
Serial No. 694,074

Claims priority, application Italy September 20, 1957

2 Claims. (Cl. 260—488)

Among the cortico-models synthesized by Giraldi and Logemann (Ztschr. f. Physiol. Chemie 289, 19, 1951; 290, 61, 1952; 292, 58, 1953), the benzoylcarbinol acetate has shown a remarkable capillary activity in the human clinical tests.

This activity appears by parenteral administration, while it is considerably less remarkable "per os." We have found that some esters of benzoylcarbinol, i.e. those showing a slow saponification, are greatly more active "per os." These esters have the following general formula:

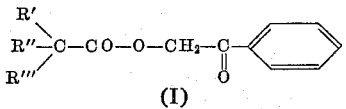
(I)

wherein R' represents a lower alkyl group and R" and R'" each represents a lower alkyl group or together represent a pentamethylene chain.

The methods for the preparation are the following:

(A) Reaction between α-halogeno-ketones and the corresponding salts of the acids.

(B) Reaction between acid-chlorides or anhydrides in the presence or in the absence of tertiary bases.

(C) Reaction between phenyldiazoketone and the corresponding acids.

(D) Reaction between benzoylcarbinol and the corresponding acids in the presence or not of a catalyst or by means of azeotropic distillation.

The following examples show but not limit the present invention.

Example 1

In 100 cc. of ethanol are added 6.75 g. of metallic sodium and 30 g. of trimethyl-acetic acid. The sodium salt is precipitated with ether and then filtered. 8.8 g. of sodium salt are dissolved in 30 cc. of water and are added of 10 g. chloroacetophenone in 110 cc. of ethanol and are refluxed for three hours. The ethanol is distillated, then it is cooled and filtered, washing on filter with water; finally it is crystallized from isopropyl alcohol. (M.P. 62-63° C.)

In the same way it is possible to react the salts of 1-methylcyclohexanecarboxylic and tripropylacetic acids and derivatives.

Example 2

13.7 g. of benzoylcarbinol and 7.9 g. of pyridine are dissolved in 100 cc. of dry chloroform and, under cooling and stirring, are added of 12 g. of trimethylacetylchloride. After one night, the solution is poured in water and extracted with ether; the ethereal solution is dried, concentrated and the residue is crystallized from isopropyl alcohol.

Example 3

16 g. of phenyldiazoketone are added of 30 g. of trimethylacetic acid and are heated on oil bath until a temperature of 150° C. After the stream of nitrogen ceases, the solution is cooled and added with ether; the ethereal solution is washed with diluted NaOH and water. Then the solution is dried and, after evaporation of the solvent, the residue is crystallized from isopropyl alcohol.

Example 4

(a) 13.6 g. of benzoylcarbinol are mixed with 10.2 g. of trimethylacetic acid and, after addition of 1-2 drops of sulfuric acid, are heated on water bath. After cooling, the residue is crystallized from isopropyl alcohol.

(b) Equimolecular quantities of benzoylcarbinol and trimethylacetic acid are heated in benzene until the water is completely eliminated (azeotropic distillation). After cooling, the benzene is concentrated and the residue is crystallized from isopropyl alcohol.

We claim:

1. Tertiary esters of benzoylcarbinol of the general formula

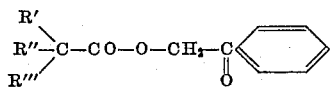

wherein R' represents a lower alkyl group and R" and R'" together are selected from the group consisting of two lower alkyl groups and a pentamethylene chain.

2. Benzoylcarbinol trimethylacetate.

References Cited in the file of this patent

Bradley et al.: J. Chem. Soc. (London) 1928, 1316–1317.
Powell: J. Am. Chem. Soc. 53, 1172 (1931).
Lundquist: J. Am. Chem. Soc. 60, 2000 (1938).
Smith et al.: J. Econ. Entomology 42, 442 (1949).
Logemann et al.: Z. Physiol. Chem., Hoppe-Seyler, 289, 23 (1951).
Houben-Weyl: Methoden der Organischen Chemie, 4th ed., vol. VIII, Oxygen Compounds III, 1952, pages 516–526 and 543–549.